US008976671B2

(12) United States Patent
Mutoh et al.

(10) Patent No.: US 8,976,671 B2
(45) Date of Patent: Mar. 10, 2015

(54) INFORMATION PROCESSING APPARATUS, CONGESTION CONTROL METHOD, AND COMPUTER-READABLE RECORDING MEDIUM

(71) Applicant: Fujitsu Limited, Kawasaki-shi (JP)

(72) Inventors: Ryoichi Mutoh, Kawasaki (JP); Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 13/717,121

(22) Filed: Dec. 17, 2012

(65) Prior Publication Data

US 2013/0235729 A1    Sep. 12, 2013

(30) Foreign Application Priority Data

Mar. 12, 2012    (JP) .................................. 2012-055012

(51) Int. Cl.
*H04L 12/26*    (2006.01)
*H04L 12/807*    (2013.01)

(52) U.S. Cl.
CPC ................ *H04L 47/27* (2013.01); *H04L 12/26* (2013.01)
USPC .......................................... 370/237; 370/229

(58) Field of Classification Search
None
See application file for complete search history.

(56) References Cited

U.S. PATENT DOCUMENTS

| 6,535,482 | B1 * | 3/2003 | Hadi Salim et al. .......... 370/229 |
| 7,706,281 | B2 * | 4/2010 | Dalal et al. ..................... 370/237 |
| 7,710,906 | B2 | 5/2010 | Kawada |
| 7,903,562 | B2 * | 3/2011 | Barnett et al. ................. 370/235 |
| 8,719,398 | B2 * | 5/2014 | Qian et al. ..................... 709/224 |
| 2005/0013245 | A1 * | 1/2005 | Sreemanthula et al. ....... 370/229 |
| 2007/0070892 | A1 * | 3/2007 | Lee et al. ....................... 370/229 |
| 2009/0209213 | A1 | 8/2009 | Kawada |
| 2011/0002224 | A1 | 1/2011 | Tamura |

FOREIGN PATENT DOCUMENTS

| JP | 2002-135330 | 5/2002 |
| JP | 2004-165817 | 6/2004 |
| JP | 2006-303925 | 11/2006 |
| JP | 2011-15288 | 1/2011 |

* cited by examiner

*Primary Examiner* — Edan Orgad
*Assistant Examiner* — Rebecca Song
(74) *Attorney, Agent, or Firm* — Fujitsu Patent Center

(57) ABSTRACT

A TCP node stores a congestion window size before congestion is detected, the congestion window size limiting the amount of data to be transmitted. If congestion is detected, the TCP node reduces a current congestion window size to a predetermined size. If path switching subsequently occurs after congestion is detected, the TCP node uses a round-trip time or bandwidth information of a path after switching to correct the congestion window size before congestion detection. The TCP node then changes the reduced congestion window size to the corrected size.

9 Claims, 15 Drawing Sheets

FIG.7

| 0 1 2 3 4 5 6 7 | 8 9 0 1 2 3 4 5 | 6 7 8 9 0 1 2 3 4 5 6 7 8 9 0 1 |
|---|---|---|
| Kind=10 | Length=4 | RTT' |

FIG.15

| 0 | 1 2 3 4 5 6 7 | 8 9 0 1 2 3 4 5 6 7 | 8 9 0 1 2 3 4 5 6 7 8 9 0 1 |
|---|---|---|---|
| 0 | Kind=11 | Length=4 | SW Delay |

FIG.16

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Kind=12 | | | | | | | | Length=4 | | | | | | | | Bandwidth | | | | | | | | | | | | | | | |

INFORMATION PROCESSING APPARATUS, CONGESTION CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2012-055012, filed on Mar. 12, 2012, the entire contents of which are incorporated herein by reference.

FIELD

The embodiments discussed herein are directed to an information processing apparatus, a congestion control method, and a computer-readable recording medium.

BACKGROUND

As a connection-oriented communication protocol to establish a session and execute communication between nodes, Transmission Control Protocol (TCP) is known. TCP is a transport layer communication protocol in an OSI reference model, and its basic specification is specified in RFC 793 of IETF.

A session of TCP is managed by port number, and is associated with a higher-level application. Upon transmission of byte data received from the higher-level application, a transmitting node notifies an offset of byte data contained in a transmission packet with a sequence number. A receiving node that has received the packet puts an offset of byte data desired to be transmitted next in an acknowledgement number of an acknowledgement packet (ACK) to send to the transmitting node and accordingly informs the transmitting node of the receipt of the byte data up to the acknowledgement number. The transmitting node understands how much of the data has arrived by receiving an ACK packet, and retransmits a data packet that has been transmitted but not yet arrived; accordingly, the reachability of data is guaranteed.

TCP controls a transmission rate by window management to prevent data from being dropped since the process of the receiving node does not catch up, and maintain fairness to another communication. The window sizes managed by TCP include a receive window size and a congestion window size. The receiving node advertises a receive window size to the transmitting node in a window field of a TCP header, the receive window size indicating the free space of a receiving buffer of the receiving node. The transmitting node manages a congestion window size that indicates the estimated amount of data that the transmitting node can transmit without causing congestion. The transmitting node limits the amount of data to be transmitted based on a smaller value of these window sizes.

TCP congestion control using the congestion window is specified in IETF RFC 2581. The transmitting node increases the congestion window size whenever receiving an ACK while executing congestion control to suppress the transmission rate by reducing the congestion window size if detecting congestion on a path. For example, if redundantly receiving an ACK to the same segment three times, the transmitting node assumes that packet loss has occurred due to congestion, and reduces the congestion window size. Similarly, if a retransmission timeout (RTO) occurs while no ACK has been received for a fixed period of time, the transmitting node sets the congestion window size to a minimum. After reducing the congestion window size, the transmitting node gradually expands the congestion window size with the passage of time.

A technology for storing a congestion window size before congestion detection in advance and, not gradually returning the congestion window size after congestion detection but immediately returning to the stored congestion window size if congestion is removed, has also recently been known.

Patent Document 1: Japanese Laid-open Patent Publication No. 2006-303925
Patent Document 2: Japanese Laid-open Patent Publication No. 2004-165817
Patent Document 3: Japanese Laid-open Patent Publication No. 2002-135330
Patent Document 4: Japanese Laid-open Patent Publication No. 2011-015288

However, the congestion control of the known technologies has a problem that the throughput that is originally supposed to be obtainable is not obtained after congestion detection in some cases.

Generally, the optimum value of the TCP window size is the bandwidth-delay product expressed in the product of a network bandwidth and a round-trip time. In order to promote fairness to another session and optimize the entire network, a transmitting node executes congestion avoidance control such that the congestion window size is brought close to the bandwidth-delay product in individual sessions.

In the known technologies, if packet loss occurs as congestion detection, the congestion window size is reduced to execute congestion control. However, the path may be switched after congestion is detected. In this case, if the path changes, the round-trip time and the bandwidth also change and the optimum value of the congestion window size expressed in the bandwidth-delay product also increases or decreases. In other words, in the known technologies, the congestion window size is controlled to return to an optimum value for the path where congestion has occurred after congestion detection; accordingly, the throughput that is originally supposed to be obtainable is not necessarily obtained.

SUMMARY

According to an aspect of the embodiment, an information processing apparatus includes: a memory that stores a congestion window size before congestion is detected, the congestion window size limiting an amount of data to be transmitted; and a processor coupled to the memory, wherein the processor executes a process comprising: reducing a current congestion window size to a predetermined size, upon the congestion being detected; correcting, upon path switching occurring after the congestion is detected, the congestion window size before congestion detection which is stored in the memory, using a round-trip time or bandwidth information of a path after switching; and changing the reduced congestion window size to the size corrected at the correcting.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a view illustrating an example of an option to notify RTT;

FIG. 15 is a view illustrating an example of an option of a packet to notify a switching time;

FIG. 16 is a view illustrating an example of an option to notify a bandwidth.

DESCRIPTION OF EMBODIMENTS

Preferred embodiments will be explained with reference to accompanying drawings. The present invention is not limited to the embodiments.

[a] First Embodiment

Figure 1:
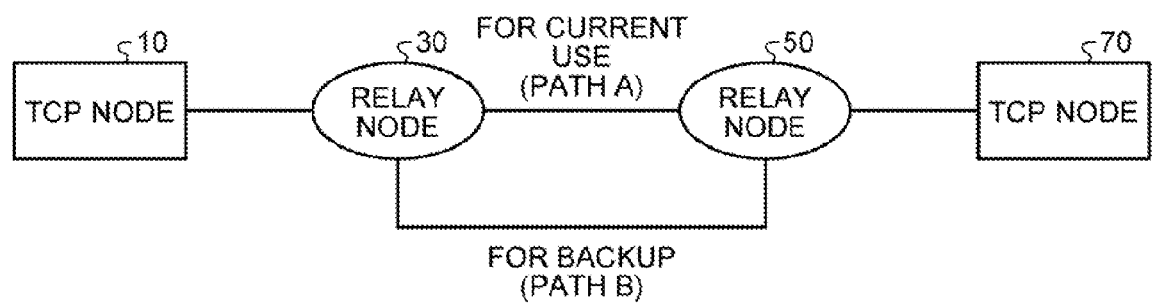
FIG. 1 is a view illustrating an entire configuration example of a system according to a first embodiment.

FIG. 1 is a view illustrating an entire configuration example of a system according to a first embodiment. As illustrated in FIG. 1, in the system, a TCP (Transmission Control Protocol) node 10 and a TCP node 70 are connected in a manner capable of communication, via a relay node 30 and a relay node 50.

The relay nodes 30 and 50 are relay devices, such as a switch and a router, that relay data transfer between the TCP nodes. Moreover, a communication path between the relay nodes 30 and 50 is made redundant. Specifically, the relay nodes 30 and 50 use a path A for current use and switches to a path B to maintain communication if congestion or a failure occurs in the path A.

The TCP node 10 is a server or the like that establishes a connection with the TCP node 70, and transmits and receives data in TCP. Similarly, the TCP node 70 is a server or the like that establishes a connection with the TCP node 10, and transmits and receives data in TCP. The TCP nodes exchange receive window sizes to compare with their congestion window sizes, and limits the amount of data to be transmitted based on the smaller value. Here, it is assumed that the receive window size is sufficiently large, and a TCP node on the transmitting side controls a TCP segment, in other words, a TCP packet in accordance with the congestion window size.

Figure 2:
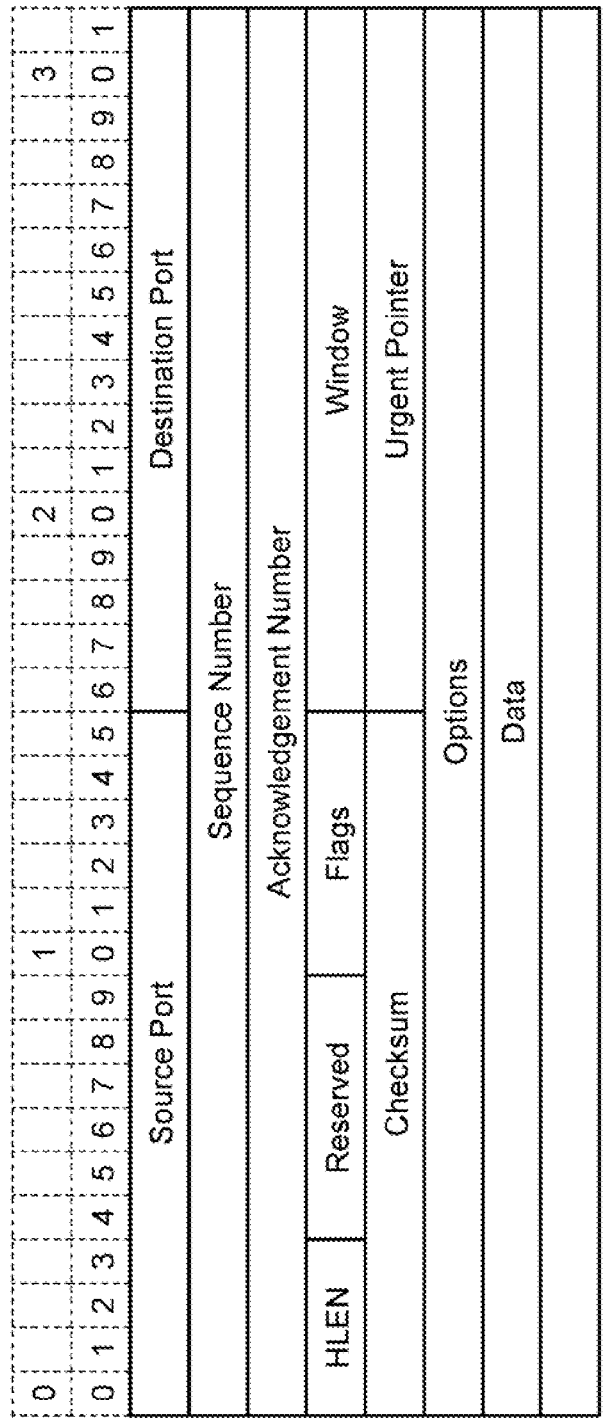
FIG. 2 is a view illustrating an example of the format of a TCP segment.

FIG. 2 is a view illustrating an example of the format of a TCP segment. As illustrated in FIG. 2, a TCP segment is configured of Source Port, Destination Port, Sequence Number, Acknowledgement Number, HLEN, Reserved, Flags, Window, Checksum, Urgent Pointer, Options, and Data.

Source port is 16-bit information indicating the source port number. Destination port is 16-bit information indicating the destination port number. Sequence number is 32-bit information indicating the sequential order of data. Acknowledgement number is 32-bit information indicating the transmission sequence number transmitted from the other end.

HLEN is 4-bit information specifying the length of a TCP header in units of 32 bits. Reserved is a reserved area for extension and is normally set to 0. Flags are 6-bit information indicating the contents of control. For example, Flags include URG (urgent), ACK (acknowledgement), PUSH (push function), RST (forced disconnection), SYN (connection request), and FIN (reply). Window is 16-bit information indicating the amount of data that can be stored in a receiving buffer of the receiver, in other words, the receive window size. Checksum is a field for error control and is 16-bit information. Urgent Pointer is 16-bit information indicating the location of data that needs an urgent process if the URG flag in Flags is "1". Options are an area that the user can arbitrarily use. Data is an area where data targeted for transmission is stored.

Figure 3:
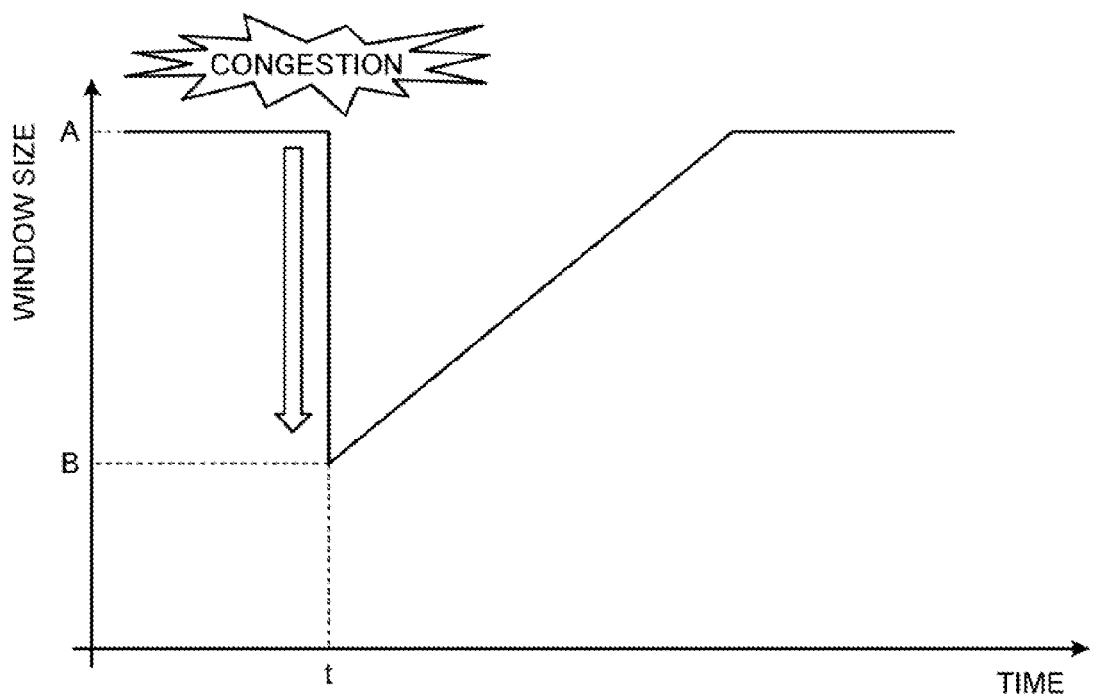
FIG. 3 is a view for explaining congestion control.

Moreover, the TCP nodes execute congestion control if congestion is detected. FIG. 3 is a view for explaining congestion control. For example, as illustrated in FIG. 3, the TCP node 10 on the transmitting side establishes a connection with the TCP node 70 on the receiving side, sets the congestion window size to (A), and transmits a TCP segment to the TCP node 70. The TCP node 10 then detects packet loss and detects that congestion has occurred, at time t. The TCP node 10 changes the congestion window size from (A) to (B), and transmits a TCP segment to the TCP node 70 in accordance with the congestion window size (B). The TCP node 10 subsequently gradually expands the congestion window size from (B) until reaching to (A) with the passage of time. In this manner, the TCP node controls the transmission rate when congestion occurs and accordingly realizes early recovery from congestion and the inhibition of packet loss.

Here, the TCP node according to the first embodiment stores a congestion window size before congestion is detected, the congestion window size limiting the amount of data to be transmitted. The TCP node then reduces a current congestion window size to a predetermined size if congestion is detected. If path switching subsequently occurs after congestion is detected, the TCP node uses a round-trip time or bandwidth of the switched path to correct the congestion window size before congestion detection, the size being stored. The TCP node then changes the reduced congestion window size to the corrected size.

In this manner, the TCP node according to the first embodiment uses the round-trip time or bandwidth of a path switched after congestion to change the congestion window size from the size before congestion to the corrected size and accordingly can transmit data at a transmission rate suitable to the switched path. As a result, it is possible to inhibit decrease in throughput after congestion detection.

[b] Second Embodiment

Next, in a second embodiment, a description will be given of an example where a TCP node on a transmitting side receives path switching executed by a relay node from a receiving node. Here, a description will be given, taking an example where the TCP node 10 is a node on the transmitting side, and the TCP node 70 is a node on the receiving side.

Congestion Control of Second Embodiment

Figure 4:
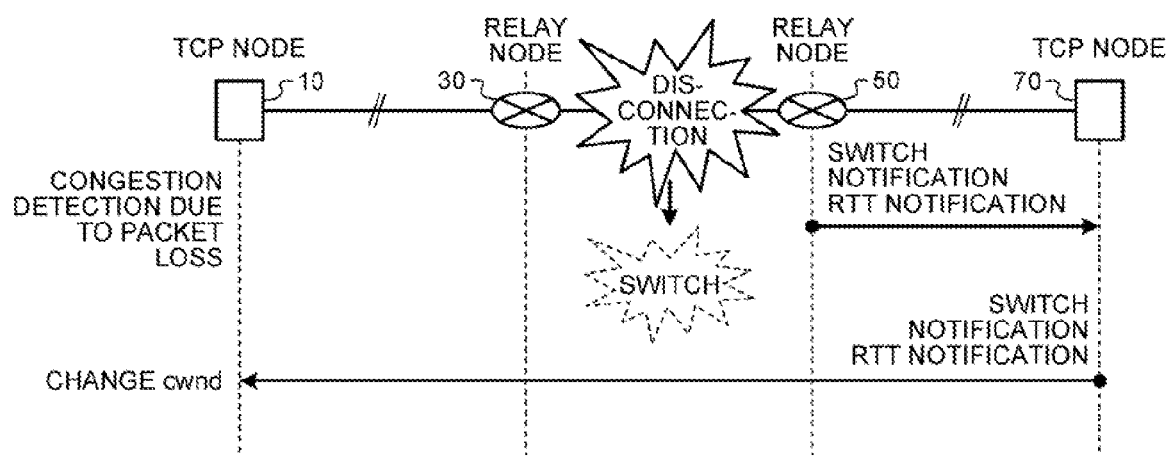
FIG. 4 is a view for explaining congestion control according to a second embodiment.

FIG. 4 is a view for explaining congestion control according to the second embodiment. As illustrated in FIG. 4, a network configuration of the second embodiment is assumed to be similar to that of FIG. 1. In the second embodiment, if detecting congestion due to packet loss, the TCP node 10 reduces the congestion window size from "cwnd" at normal time. At this point, the TCP node 10 holds the window size before change, "cwnd", as "cwnd'".

If path switching subsequently occurs between the relay nodes, the relay node 50 notifies a switch notification and RTT to the TCP node 70. The TCP node 70 notifies the TCP node 10 of the switch notification and RTT, which have been received from the relay node 50. The TCP node 10 detects with the notification that path switching has occurred. The TCP node then corrects the held congestion window size, "cwnd'", with the notified RTT, and changes the reduced congestion window size to the corrected size.

Figure 5:
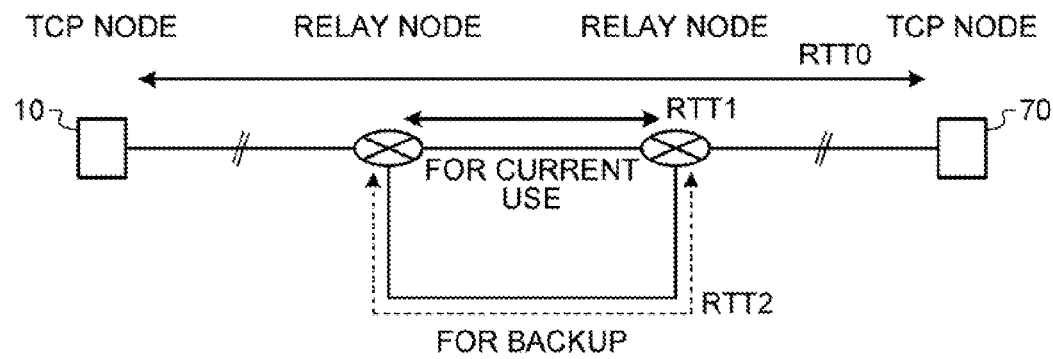
FIG. 5 is a view for explaining an RTT measurement example of a network according to the second embodiment.

Here, a description will be given of RTT with reference to FIG. 5. FIG. 5 is a view for explaining an RTT measurement example of a network according to the second embodiment. The TCP node 10 measures RTT 0 as a round-trip time in between with the TCP node 70. The TCP node 10 measures a time from the transmission of a TCP packet to the receipt of an ACK as RTT, as a standard operation of TCP.

The relay nodes measure RTT 1 as the round-trip time of a current path, and measure RTT 2 as the round-trip time of a backup path. The relay nodes measure the delays of the paths in advance. The relay nodes then calculate and hold a difference in RTT between the current path and the backup path, "RTT'=RTT 2–RTT 1".

Figure 6:
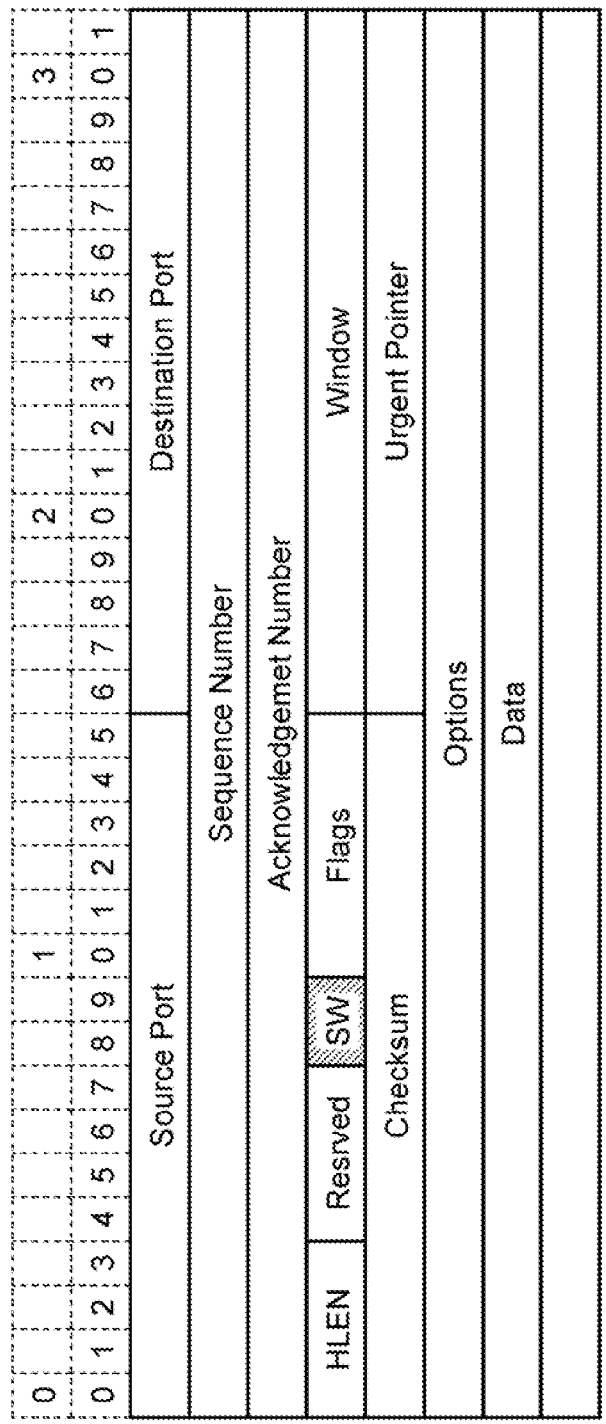
FIG. 6 is a view illustrating a format example of a switch notification packet.

Next, a description will be given of a method where the relay node notifies path switching and RTT with reference to FIGS. 6 and 7. FIG. 6 is a view illustrating a format example of a switch notification packet. FIG. 7 is a view illustrating an example of an option to notify RTT. As illustrated in FIG. 6, the relay node newly provides an SW field indicating a path switch flag in the reserved field in the format of a normal TCP packet, and inserts 01 in the SW field and accordingly notifies the occurrence of path switching. At this point, the relay node substitutes the values illustrated in FIG. 7 to the option field of the TCP packet for transmission. Specifically, as illustrated in FIG. 7, the relay node creates an option field where 10 is set in kind indicating to notify RTT, 4 is set in length indicating an option length, and RTT' is substituted.

The TCP node 70 changes the setting of the SW field of the switch notification packet received from the relay node to 10 to transmit to the TCP node 10. If receiving the TCP packet from the TCP node 70, the TCP node 10 can detect that path switching has occurred since the SW field of the packet is 10. Moreover, the TCP node 10 reads RTT' from the option of the TCP packet notified of path switching, and corrects the congestion window size with this RTT'.

Hardware Configuration

Figure 8:
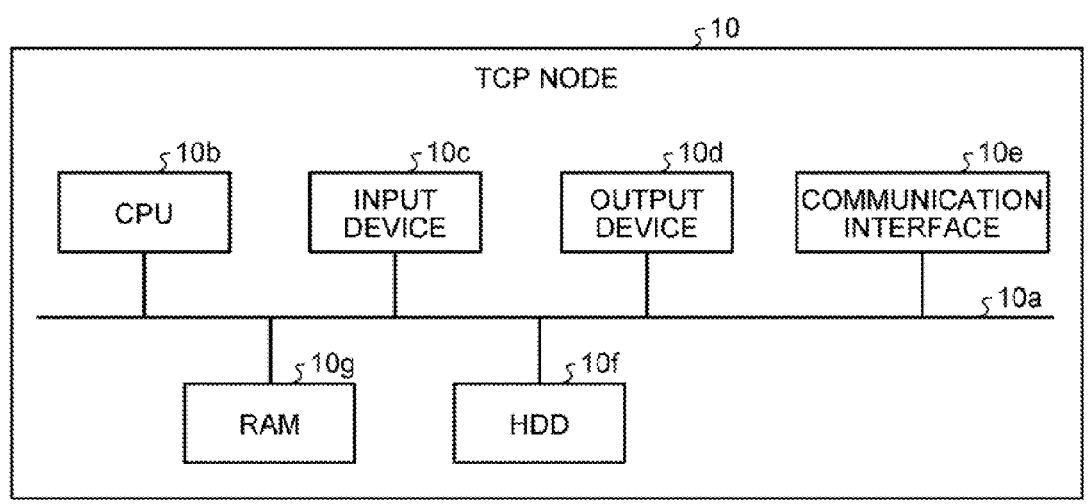
FIG. 8 is a view illustrating a hardware configuration example of a TCP node.

Next, a description will be given of hardware configurations of the nodes according to the second embodiment. The nodes have similar configurations; accordingly, here, a description will be given, taking the transmitting node as an example. FIG. 8 is a view illustrating a hardware configuration example of the TCP node.

As illustrated in FIG. 8, the TCP node 10 includes a CPU 10b, an input device 10c, an output device 10d, a communication interface 10e, a Hard Disk Drive (HDD) 10f, and a Random Access Memory (RAM) 10g. Moreover, the units illustrated in FIG. 8 are connected to each other with a bus 10a.

The input device 10c is a mouse or keyboard, the output device 10d is a display or the like, and the communication interface 10e is an interface such as a Network Interface Card (NIC). The HDD 10f stores a program, data, and the like, which are executed by the CPU 10b. The HDD 10f has been given as an example of a recording medium; however, various programs may be stored in a recording medium, such as Read Only Memory (ROM), RAM, and a CD-ROM, that can be read by another computer, and caused to be read by the computer. A recording medium may be placed at a remote location, and a computer may access the recording medium to acquire and use a program. Moreover, at that point, the acquired program may be stored in the own recording medium of the TCP node 10 to be used.

The CPU 10b is a processor to govern the overall processes of the TCP node 10, and reads a program to execute similar processes to processors, which are described in the second embodiment, to expand the program into the RAM 10g, and accordingly operates processes to execute functions. In other words, the processes execute similar functions to FIGS. 9 and 10, which will be described below. In this manner, the TCP node 10 reads and executes a program to operate as an information processing apparatus that executes a congestion control method to be described in the second embodiment.

Configuration of Relay Node

Figure 9:
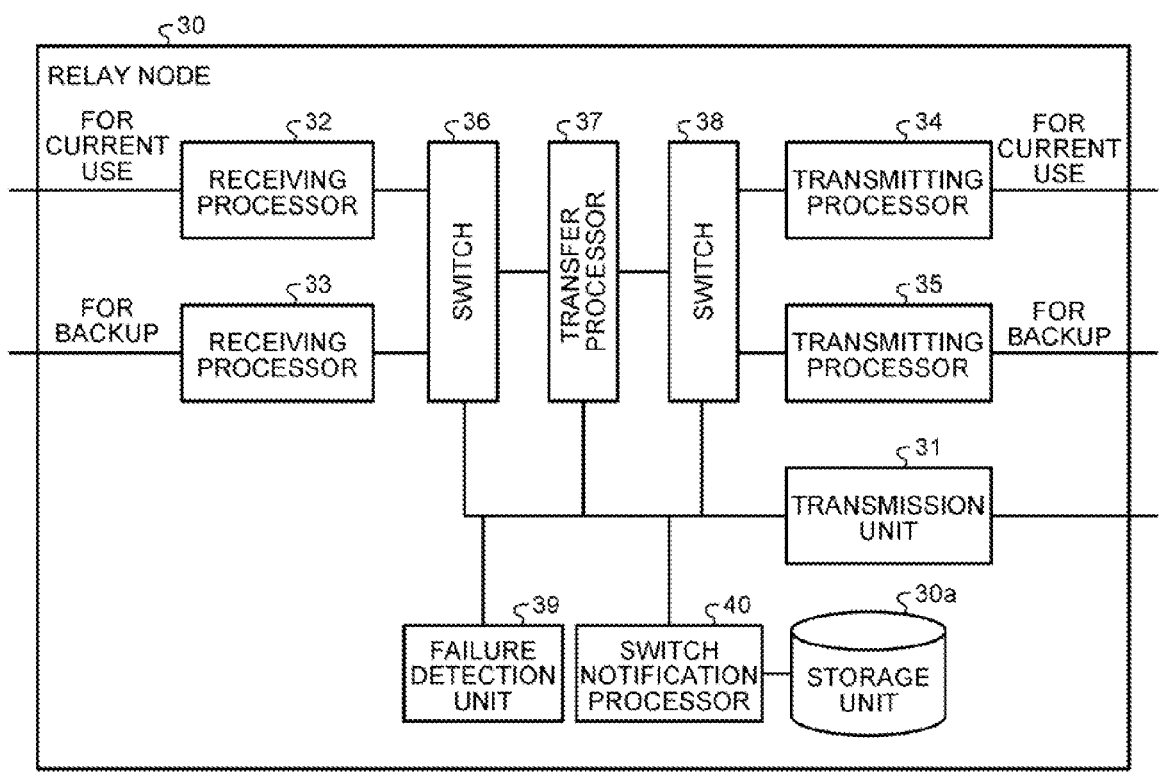
FIG. 9 is a functional block diagram illustrating the configuration of a relay node according to the second embodiment.

FIG. 9 is a functional block diagram illustrating the configuration of the relay node according to the second embodiment. The relay nodes 30 and 50 have similar configurations; accordingly, here, a description will be given of the relay node 30. As illustrated in FIG. 9, the relay node 30 includes a storage unit 30a, a transmission unit 31, a receiving processor 32, a receiving processor 33, a transmitting processor 34, and a transmitting processor 35. Moreover, the relay node 30 includes a switch 36, a transfer processor 37, a switch 38, a failure detection unit 39, and a switch notification processor 40. The processors are processors to be executed by a CPU, and the storage unit 30a is a storage device such as memory.

The storage unit 30a is a storage unit that stores a program and various data. For example, the storage unit 30a stores the use conditions of the current use and the backup, and stores RTT 1, RTT 2, and RTT', which are described in FIG. 5. Moreover, the storage unit 30a stores path information and the like.

The transmission unit 31 is a processor that controls communication with the TCP node. For example, the transmission unit 31 transmits a TCP packet that notifies path switching and RTT to the TCP node 70.

The receiving processor 32 is a processor that controls a receiving process using the current path. For example, the receiving processor 32 receives a TCP packet transmitted by the correspondent relay node 50 via the current path. The receiving processor 33 is a processor that controls a receiving process using the backup path. For example, the receiving processor 33 receives a TCP packet transmitted by the correspondent relay node 50 via the backup path.

The transmitting processor 34 is a processor that controls a transmission process using the current path. For example, the transmitting processor 34 transmits a TCP packet to the correspondent relay node 50 via the current path. Moreover, the transmitting processor 35 is a processor that controls a transmission process using the backup path. For example, the transmitting processor 34 transmits a TCP packet to the correspondent relay node 50 via the backup path.

The switch 36 is a processor that executes switching of receiving paths. For example, the switch 36 switches the receiving path from the receiving processor 32 to the receiving processor 33 at the directions of the failure detection unit 39, the switch notification processor 40, and the like. The switch 36 then outputs to the transfer processor 37 the TCP packet inputted from the receiving processor 32 or 33.

The transfer processor 37 is a processor that transfers the TCP packet to the destination. For example, the transfer processor 37 identifies the destination from the TCP packet inputted from the switch 36, and identifies the transmitting processor of the transmission destination in accordance with path information stored in the storage unit 30a. The transfer processor 37 then outputs the TCP packet to a switch connected to the decided transmitting processor.

The switch 38 is a processor that executes switching of transmission paths. For example, the switch 38 switches the transmission path from the transmitting processor 34 to the transmitting processor 35 at the directions of the failure detection unit 39, the switch notification processor 40, and the like. The switch 38 then outputs to the transmitting processor 34 or 35 the TCP packet inputted from the transfer processor 37.

The failure detection unit 39 is a processor that detects a failure that has occurred in the current or backup path. For example, the failure detection unit 39 detects a failure by a generally widely used monitoring method such as polling. The failure detection unit 39 then outputs to the switches 36 and 38 the direction to switch from the current path to the backup path if a failure is detected. Moreover, the failure detection unit 39 outputs to the switch notification processor 40 the fact that the path has been switched due to failure detection.

The switch notification processor 40 is a processor that notifies path switching and RTT to the TCP node. For example, if being notified of the occurrence of path switching by the failure detection unit 39, the switch notification processor 40 reads RTT' from the storage unit 30a and creates the option field illustrated in FIG. 7. The switch notification processor 40 subsequently creates a switch notification packet into which the option field has been inserted, the switch notification packet being illustrated in FIG. 6, to transmit to the TCP node 70. In the second embodiment, the switch notification packet that has been transmitted in this manner is received by the TCP node 10 via the TCP node 70.

Configuration of TCP Node

Figure 10:
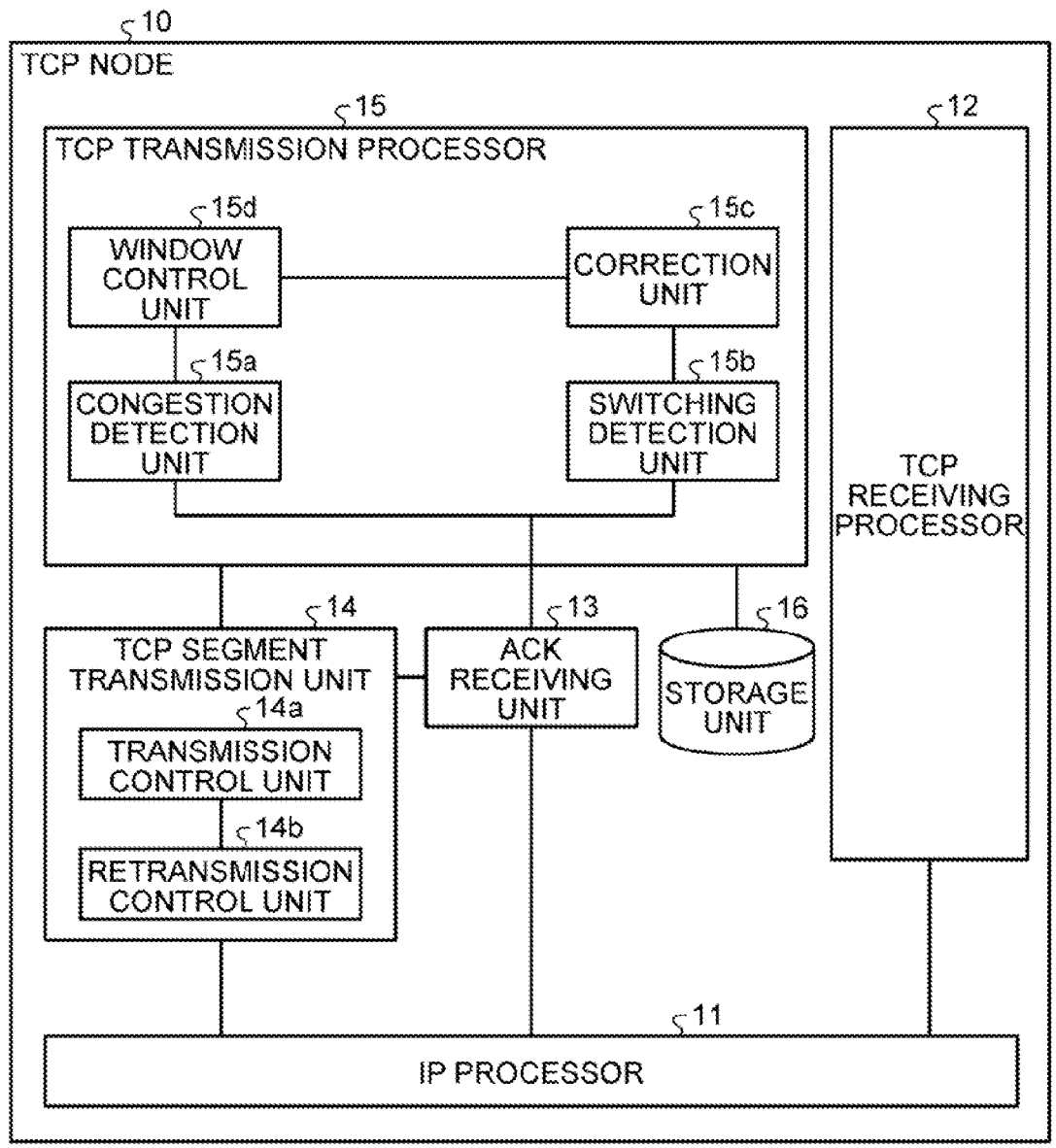
FIG. 10 is a functional block diagram illustrating the configuration of the TCP node according to the second embodiment.

Next, a description will be given of the configuration of the TCP node. The TCP nodes 10 and 70 have similar configurations; accordingly, here, a description will be given, taking the TCP node 10 as an example. FIG. 10 is a functional block diagram illustrating the configuration of the TCP node according to the second embodiment.

As illustrated in FIG. 10, the TCP node 10 includes an Internet Protocol (IP) processor 11, a TCP receiving processor 12, an ACK receiving unit 13, a TCP segment transmission unit 14, and a TCP transmission processor 15.

The IP processor 11 is a processor that controls communication with the relay node. For example, the IP processor 11 creates a TCP packet where an IP header is added to a TCP segment outputted from the TCP segment transmission unit 14 to transmit to the relay node 30. Moreover, the IP processor 11 deletes the IP header from a TCP packet received from the relay node 50, and creates a TCP segment to output to the processors such as the TCP receiving processor 12 and the ACK receiving unit 13.

The TCP receiving processor 12 is a processor that executes a receiving process on the received TCP packet. For example, the TCP receiving processor 12 retrieves data from the TCP segment outputted from the IP processor 11 to output to an application. Moreover, the TCP receiving processor 12 transmits an ACK indicating to have received normally, as a response to the received TCP packet, to the source of the TCP packet.

The ACK receiving unit 13 receives the ACK and outputs the receipt result to a retransmission control unit 14b of the TCP segment transmission unit 14 and a window control unit 15d of a TCP transmission processor 15. For example, the ACK receiving unit 13 receives an ACK to the TCP segment transmitted from the TCP segment transmission unit 14, among the TCP packets received by the IP processor 11, to output to the retransmission control unit 14b and the window control unit 15d.

The TCP segment transmission unit 14 is a processor, including a transmission control unit 14a and the retransmission control unit 14b, for transmitting a TCP segment. The TCP segment outputted from the TCP segment transmission unit 14 is inputted into the IP processor 11, and becomes a TCP packet by the IP processor 11 to be transmitted to the destination. The TCP segment transmission unit 14 puts the transmitted TCP segment in a retransmission queue in the retransmission control unit once.

The transmission control unit 14a is a processor that transmits a TCP segment. For example, the transmission control unit 14a creates a TCP segment, accepts a window size from the TCP transmission processor 15, and outputs the TCP segment to the destination while controlling the bandwidth with the accepted window size.

The retransmission control unit 14b is a processor that retransmits a TCP segment. For example, if accepting a retransmission direction from the TCP transmission processor 15 or the ACK receiving unit 13, the retransmission control unit 14b retransmits the directed TCP segment. Moreover, if detecting that the correspondent apparatus has not been able to receive normally, from the ACK received by the ACK receiving unit 13, the retransmission control unit 14b executes a retransmission process. Moreover, the TCP segment confirmed that could be received normally from the ACK receiving unit is deleted from the retransmission queue.

The TCP transmission processor 15 includes a congestion detection unit 15a, a switch detection unit 15b, a correction unit 15c and the window control unit 15d, and executes various processes related to the transmission of a TCP segment. The congestion detection unit 15a is a processor that detects packet loss based on the ACK receipt result by the ACK receiving unit 13, and detects congestion. For example, the congestion detection unit 15a detects packet loss using various methods such as cases where an ACK to the same segment is redundantly received three times, and a retransmission timeout has passed while no ACK has been received for a fixed period of time. If detecting packet loss, the congestion detection unit 15a detects that congestion has occurred. The congestion detection unit 15a subsequently notifies the correction unit 15c and the window control unit 15d that congestion has been detected.

The switch detection unit 15b is a processor that detects that path switching has occurred. Specifically, if the packet that indicates path switching has occurred is received by the IP processor 11, the switch detection unit 15b detects the occurrence of path switching. For example, the switch detection unit 15b refers to the SW field indicating the path switch flag of the received TCP packet, and determines that the TCP packet is a path switching packet if the SW field is 10. The switch detection unit 15b then outputs the path switching packet to the correction unit 15c.

If path switching occurs after congestion is detected, the correction unit 15c uses the round-trip time or bandwidth of the switched path to correct the congestion window size before congestion detection, the size being stored in a storage unit 16. For example, if being notified by the congestion detection unit 15a that congestion occurred and subsequently being notified by the switch detection unit 15b that path switching occurred, the correction unit 15c acquires the window size before congestion, "cwnd'", and the round-trip time, "RTT 0", from the storage unit 16. Moreover, the correction unit 15c reads "RTT'" from the option field of the path switching packet inputted from the switch detection unit 15b.

The correction unit 15c subsequently calculates "cwnd'× (RTT 0+RTT')/RTT 0" and sets this as the congestion window size after correction, "cwnd''". The correction unit 15c then outputs the congestion window size after correction, "cwnd''", to the window control unit 15d. The storage unit 16 is a storage device that stores "cwnd'" being the window size before congestion, "cwnd" being the current congestion window size, and "RTT 0" being the round-trip time.

The window control unit 15d is a processor that controls the window size. The window control unit 15d stores in the storage unit 16 the congestion window size of when the TCP node transmits a TCP packet normally, in other words, the congestion window size before congestion detection.

For example, if congestion is detected by the congestion detection unit 15a, the window control unit 15d reduces the congestion window size to a predetermined value to execute congestion control. Examples include that the window control unit 15d reduces the congestion window size to a minimum value. The window control unit 15d subsequently gradually increases the congestion window size with the passage of time. Whenever changing the size, the window control unit 15d notifies the changed size to the TCP segment transmission unit 14.

Moreover, if receiving the correction value, "cwnd''" from the correction unit 15c, the window control unit 15d changes the congestion window size. For example, the window control unit 15d compares "cwnd''" accepted from the correction unit 15c with the current congestion window size "cwnd" and selects the larger one. The window control unit 15d then changes the congestion window size to the selected size, and notifies the changed size to the TCP segment transmission unit 14.

Processes of TCP Node

Figure 11:
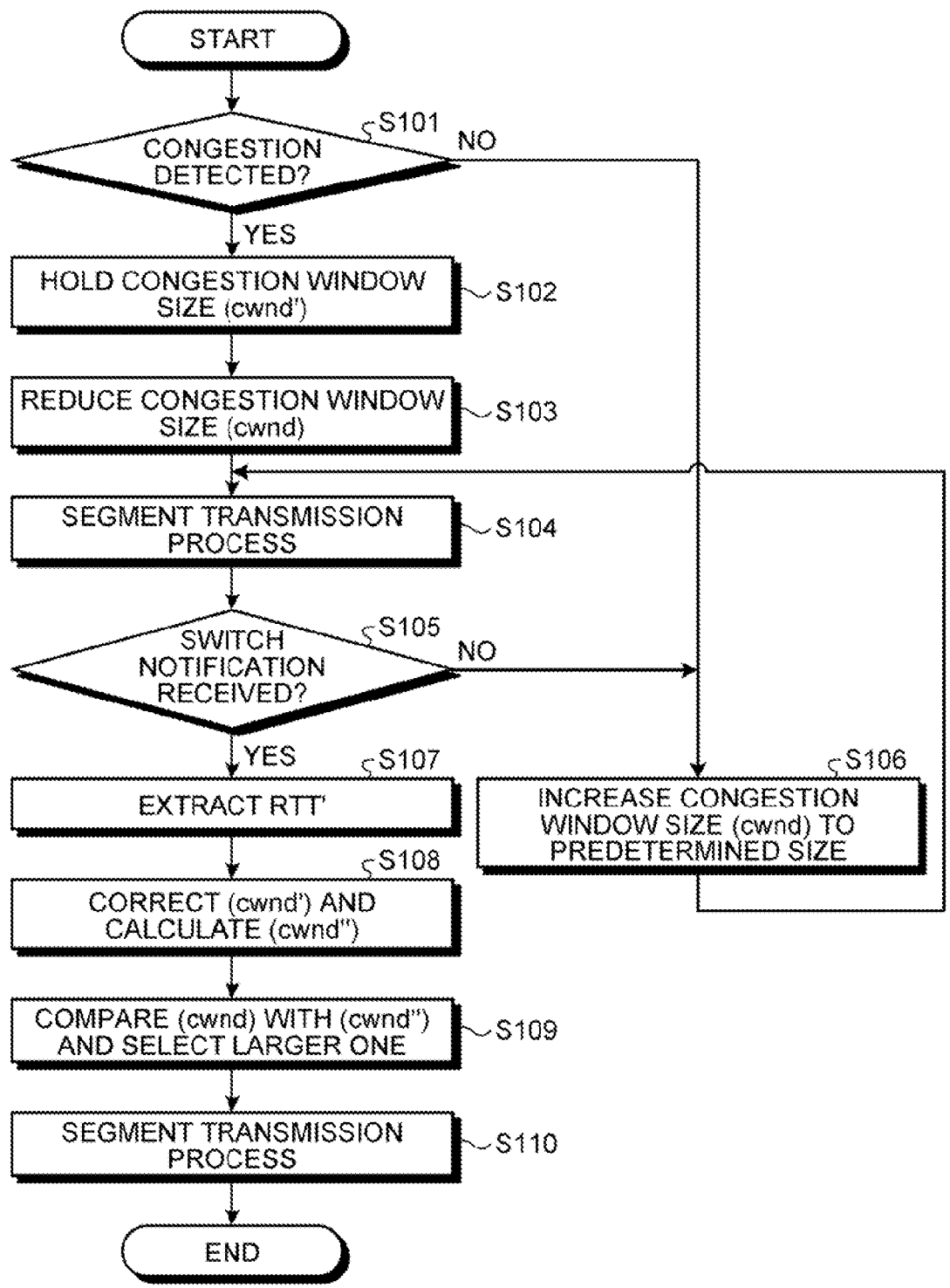
FIG. 11 is a flowchart illustrating a flow of congestion control processes according to the second embodiment.

FIG. 11 is a flowchart illustrating a flow of congestion control processes according to the second embodiment. As illustrated in FIG. 11, if detecting congestion (S101 Yes), the window control unit 15d of the TCP node 10 holds in the storage unit 16 the congestion window size before congestion, "cwnd'" (S102).

The transmission control unit 14a of the TCP segment transmission unit 14 then reduces the congestion window size, "cwnd" (S103). Next, the transmission control unit 14a executes a transmission process of a TCP segment in accordance with the reduced window size, "cwnd", which is specified by the window control unit 15d (S104).

The switch detection unit 15b then determines whether or not path switching has occurred (S105). In other words, the switch detection unit 15b determines whether to have received the path switching packet that notifies path switching.

If path switching has not occurred (S105 No), the window control unit 15d gradually increases the reduced window size, "cwnd", to a predetermined size (S106). The transmission control unit 14a executes the transmission process of the TCP segment in accordance with the window size, "cwnd", which is controlled by the window control unit 15d (S104).

On the other hand, if path switching has occurred by the switch detection unit 15b (S150 Yes), the correction unit 15c extracts "RTT'" from the path switching packet (S107). The correction unit 15c then corrects "cwnd'" stored in the storage unit to calculate "cwnd''" (S108). The window control unit 15d subsequently compares the current congestion window size, "cwnd", with the corrected "cwnd''" and directs the TCP segment transmission unit 14 to execute the transmission process with the larger window size (S109). The transmission control unit 14a subsequently executes the transmission process of the TCP segment in accordance with the window size specified by the window control unit 15d (S110).

If not detecting congestion (S101 No), the window control unit 15d gradually increases the window size, "cwnd", to a predetermined size (S106), and the transmission control unit 14a executes the processes after S104.

Effects

If detecting packet loss, the TCP node according to the first embodiment stores the original congestion window size and performs normal congestion control. On the other hand, the relay node that has performed path switching gives switch notification with information related to the difference of round-trip times. The TCP node that has received the switch notification changes a value to a value corrected with the difference of round-trip times based on the congestion window size before congestion detection, the size being held by itself. By doing so, it is possible to change the congestion window size to an optimum value using the round-trip time that has changed due to path switching; accordingly, it is possible to obtain a throughput that is originally supposed to be obtainable, after congestion detection.

Figure 12:
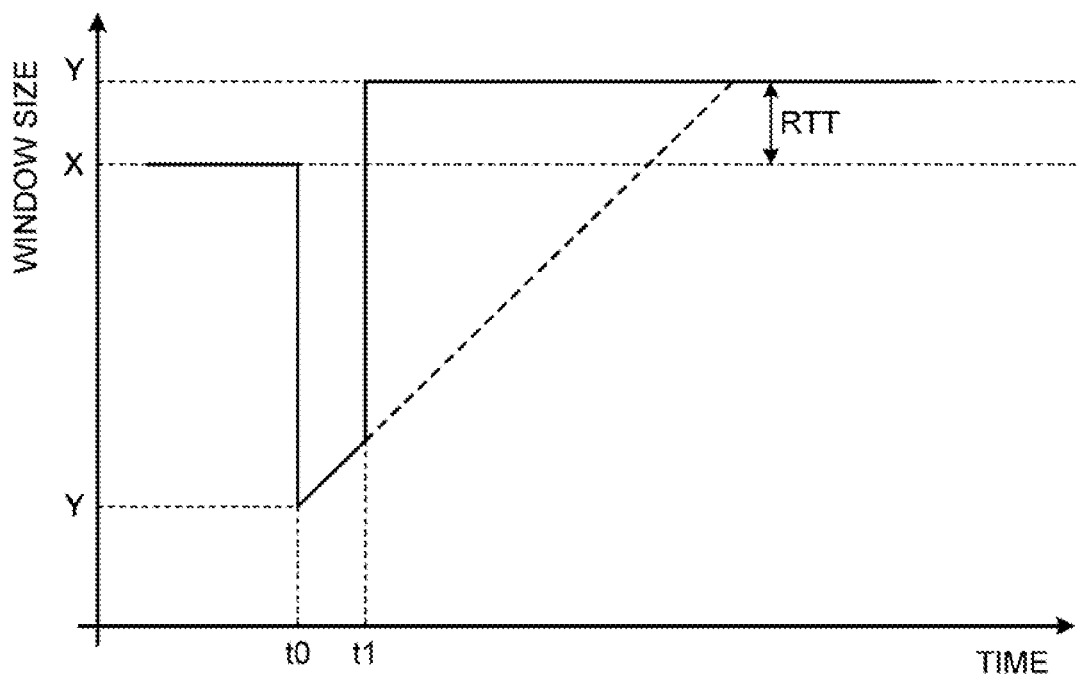
FIG. 12 is a view illustrating change in congestion window size after path switching.

FIG. 12 is a view illustrating change in congestion window size after path switching. As illustrated in FIG. 12, after a connection is established, the TCP node 10 gradually increases the congestion window size, and finally transmits a TCP segment in accordance with an optimum value, "X", of the congestion window size. If subsequently detecting congestion due to packet loss at time t0, the TCP node 10 reduces the congestion window size to "Y", and executes congestion control.

The TCP node 10 subsequently receives a path switching packet at time t1. The TCP node 10 then calculates a window size, "Z", from the original window size, "X", based on the difference of round-trip times before and after patch switching, the difference being included in the path switching packet. The TCP node 10 subsequently stops normal congestion control, changes the congestion window size to "Z", and executes the transmission process of the TCP segment.

In this manner, if path switching occurs after congestion detection, the TCP node 10 can change the congestion window size to an optimum size using RTT of the switched path. Therefore, the TCP node 10 can execute the transmission process with a congestion window size suitable to the switched path.

[c] Third Embodiment

In the second embodiment, the description has been given of the example where the relay node transmits a switch notification and the difference of round-trip times to the transmitting node via the receiving node, but the embodiment is not limited to this. In a third embodiment, a description will be given of an example where the relay node transmits a switch notification to the transmitting node via the receiving node, and the transmitting node measures a round-trip time.

Figure 13:
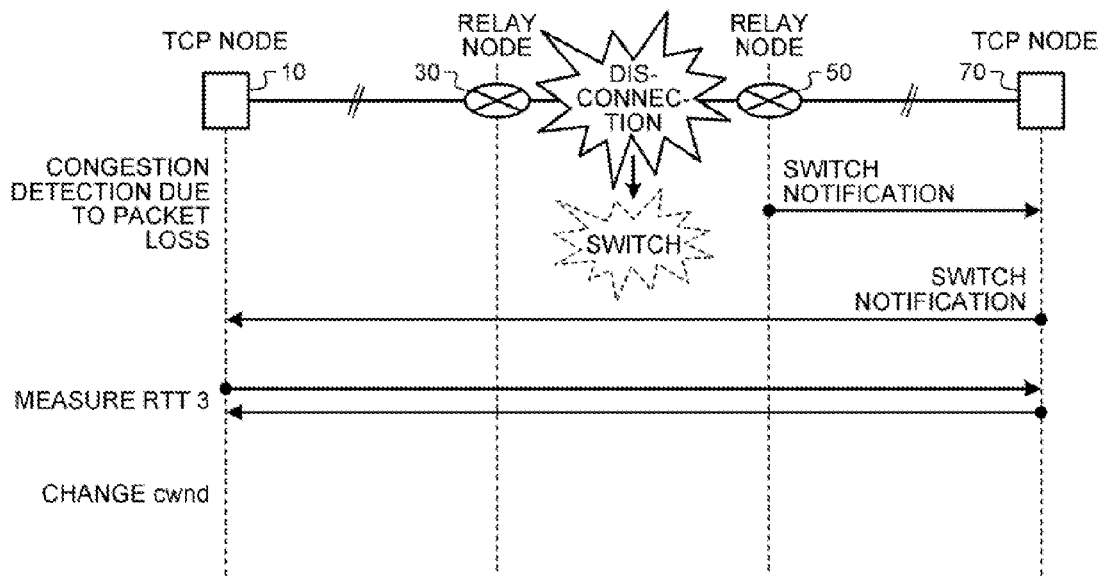
FIG. 13 is a view for explaining congestion control according to a third embodiment.

FIG. 13 is a view for explaining congestion control according to the third embodiment. As illustrated in FIG. 13, the network configuration is assumed to be similar to those of the first and second embodiments. If detecting congestion due to packet loss, the window control unit 15d of the TCP node 10 reduces the congestion window size, "cwnd". At this point, the window control unit 15d of the TCP node 10 holds the window size before change, "cwnd'". The window control unit 15d subsequently executes a normal congestion process and gradually expands the current congestion window size, "cwnd".

If path switching subsequently occurs between the relay nodes, the relay node 50 notifies a switch notification to the TCP node 70. The TCP node 70 notifies the TCP node 10 of the switch notification received from the relay node 50. The switch notification at this point is a packet where 01 is set in the SW field illustrated in FIG. 6. A different point from the second embodiment is a point that RTT' is not set in the option field.

The TCP node 70 changes the SW field of the switch notification packet received from the relay node 50 from 01 to 10 and subsequently transmits the packet to the TCP node 10. The switch detection unit 15b of the TCP node 10 detects with the notification that path switching has occurred. The switch detection unit 15b of the TCP node then measures a round-trip time, "RTT 3", in between with the receiving node. RTT 0 is a round-trip time in the current path before switching, and RTT 3 is a round-trip time in the backup path after switching.

The correction unit 15c of the TCP node 10 subsequently calculates "cwnd'×RTT 3/RTT 0'", and sets this as the corrected congestion window size, "cwnd''". The window control unit 15d compares "cwnd''" accepted from the correction unit 15c with the current congestion window size, "cwnd", and selects the larger one. The window control unit 15d then changes the congestion window size to the selected size, and notifies the changed size to the TCP segment transmission unit 14.

In this manner, if being notified that path switching has occurred, the TCP node 10 measures a round-trip time in the switched path, and can correct the congestion window size based on the measurement result. Consequently, the TCP node 10 can correct the congestion window size based on an actual accurate round-trip time, and accordingly can secure an optimum throughput after path switching.

[d] Fourth Embodiment

In a fourth embodiment, a description will be given of an example where the TCP node 10 on the transmitting side receives a switch notification directly from the relay node 30, not via the TCP node 70 on the receiving side. Also here, the network configuration is assumed to be similar to those of the first and second embodiments.

Figure 14:
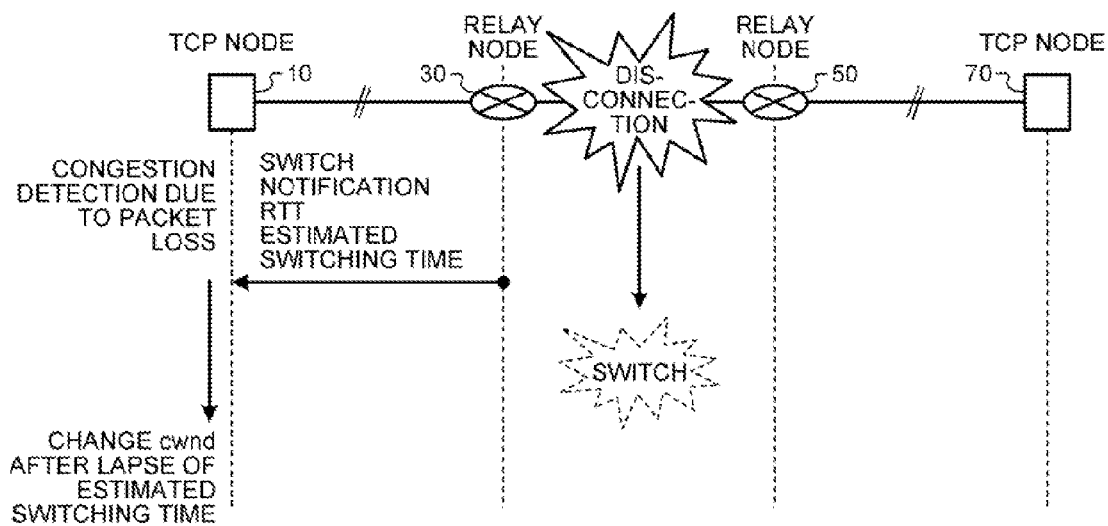
FIG. 14 is a view for explaining congestion control according to a fourth embodiment.

FIG. 14 is a view for explaining congestion control according to the fourth embodiment. As illustrated in FIG. 14, if detecting congestion due to packet loss, the window control unit 15d of the TCP node 10 reduces the congestion window size. At this point, the window control unit 15d of the TCP node 10 holds the window size before change, "cwnd", as "cwnd'". The window control unit 15d subsequently executes the normal congestion process and gradually expands the current congestion window size, "cwnd".

If path switching subsequently occurs between the relay nodes, the relay node 30 notifies a switch notification to the TCP node 10. The switch notification packet transmitted at this point is illustrated in FIG. 15. FIG. 15 is a view illustrating an example of an option of a packet to notify a switching time. As illustrated in FIG. 15, the relay node 50 creates an option field where 11 is set in "Kind" indicating to notify RTT' and an estimated switching time, 4 is set in "Length" indicating an option length, and "RTT'" and the "switching estimated time" are substituted. The relay node 30 then sets 10 in the SW field indicating the path switch flag, and transmit a path switching packet including the option illustrated in FIG. 15 to the TCP node 10. The method for calculating "RTT'" is similar to that of the second embodiment; accordingly, the detailed description will be omitted. Moreover, a switching time estimated time is assumed to be previously specified by a manager and the like.

Since the SW field of the packet received from the relay node 30 is 10, the switch detection unit 15b of the TCP node 10 predicts that path switching will occur. The correction unit 15c of the TCP node 10 then extract the round-trip time, "RTT'", and the estimated switching time, "SW Delay", from the option field of the packet.

The correction unit 15c of the TCP node 10 subsequently calculates "cwnd'" that has corrected "cwnd'" in a similar method to that of the second embodiment. The window control unit 15d of the TCP node 10 then compares "cwnd''" accepted from the correction unit 15c with the current congestion window size, "cwnd", and selects the larger one.

The window control unit 15d that has selected the window size in this manner changes the congestion window size to the selected size after a lapse of the estimated switching time, "SW Delay", extracted from the path switching packet. By doing so, it is possible to reduce unnecessary packet loss in the relay node 30.

Here, the description has been given of the example where the relay node 30 notifies an estimated switching time, but the embodiment is not limited to this. For example, the relay node 30 may notify the TCP node 10 of a round-trip time after path switching is complete. In this case, it is sufficient if the relay node 30 transmits a switch notification packet where "0" is set in "SW Delay" illustrated in FIG. 15. By doing so, the relay node 30 can transmit to the TCP node 10 the occurrence of path switching and the difference of round-trip times without delay.

[e] Fifth Embodiment

The description has hitherto been given of the embodiments of the present invention; however, the present invention can be embodied in various modes other than the above-mentioned embodiments. A description will hereinafter be given of a different embodiment.

Bandwidth

The first to fourth embodiments have been described, taking the example where the congestion window size before congestion is corrected by use of the difference of round-trip times, but are not limited to this, and can also use a bandwidth. For example, FIG. 16 is a view illustrating an example of an option to notify a bandwidth. As illustrated in FIG. 16, the relay node creates an option field where 12 is set in "Kind" indicating to notify a bandwidth, 4 is set in "Length" indicating an option length, and "Bandwidth" indicating a bandwidth after path switching is substituted. The relay node then transmits to the TCP node 10 a path switching packet including the option field illustrated in FIG. 16.

The TCP node 10 reads "BW 1" set in "Bandwidth" from the option field of the path switching packet received from the relay node. The TCP node 10 then calculates "cwnd''=cwnd'× BW 1/BW 0", using a bandwidth before path switching, "BW 0", and the window size before congestion detection, "cwnd'", which the TCP node 10 has previously held. The TCP node 10 subsequently executes data transmission using the larger one of the current congestion window size, "cwnd", and the calculated "cwnd''". In this manner, it is possible to correct the congestion window size to an appropriate size in accordance with a change in bandwidths before and after switching other than a round-trip time. For example, in the case of a network with a bandwidth of 10 Gbps, it may take several hours to fully open the reduced congestion window size, but it can be reduced to the order of several seconds.

Correction Inhibition

In the first to fourth embodiments, the description has been given of the example where the congestion window size is corrected if path switching is notified from the relay node. However, the relay node may direct the TCP node to inhibit correction if queue delay due to congestion is occurring.

For example, the TCP node starts a correction process of the congestion window size based on a path switching packet received from the relay node. The relay node subsequently transmits a packet to inhibit correction to the TCP node. If receiving this packet, the TCP node inhibits the correction process and discards the window size before congestion that it has been held.

Figure 17:
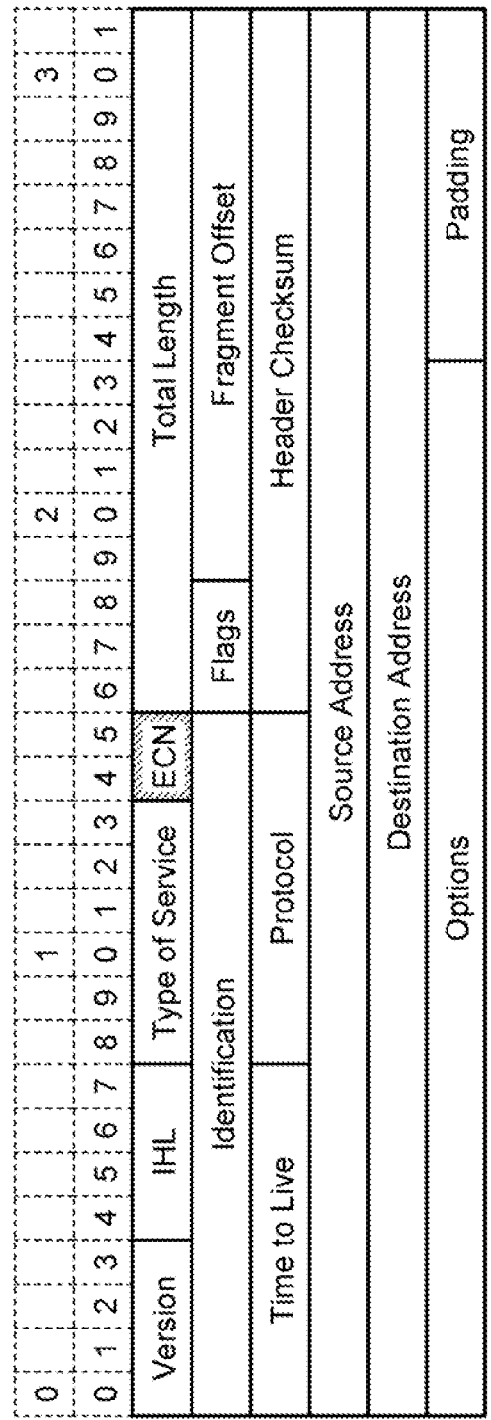
FIG. 17 is a view illustrating an example of a packet to inhibit correction.

Here, a description will be given of a packet to inhibit correction. FIG. 17 is a view illustrating an example of a packet to inhibit correction. FIG. 17 illustrates an IP header of an IP packet. Version indicated here is information indicating the version of IP, and IHL is information indicating the length of the IP header. Type of Service is information indicating priority, and Total Length is information indicating the length of the IP packet. Identification is an identifier to identify a packet, and Flags are flags indicating information related to packet division, and Fragment Offset is information indicating where the divided data is in the original data.

Time to Live is information indicating a time during which the packet can live in the network, and Header Checksum is information indicating a code for checking whether the IP header is corrupted. Source Address is a source IP address, and Destination Address is a destination IP address.

If queue delay due to congestion is occurring, the relay node sets 11 in ECN of the TOS field of such an IP header, and notifies congestion. By doing so, the TCP node can detect the occurrence of the queue delay, and can inhibit congestion control by correction and avoid congestion by normal congestion control.

Combinations of Embodiments

The above embodiments can arbitrarily be combined. For example, after receipt of the bandwidth and the estimated switching time from the relay node and a lapse of the estimated switching time, the TCP node can also change the congestion window size to the one corrected with the notified bandwidth. Moreover, if receiving the estimated switching time from the relay node, the TCP node measures a round-trip time. After a lapse of the estimated switching time, the TCP node can also change the congestion window size to the one corrected with the measured round-trip time.

System

Moreover, it is also possible to manually perform all or part of the processes that have been described assuming that they are automatically performed among the processes described in the embodiment. Otherwise, it is also possible to automatically perform all or part of the processes that have been described assuming that they are manually performed in a known method. In addition, it is possible to arbitrarily change the processing procedures, control procedures, specific names, and information including various data and parameters, which are stated in the above document and drawings unless otherwise specified.

Moreover, the illustrated elements of the apparatuses are functionally conceptual, and are not necessarily physically configured as illustrated. In other words, specific embodiments of the distribution and integration of the apparatuses are not limited to the illustrations. In other words, it is possible to functionally or physically distribute or integrate all or part of them in arbitrary units for configuration in accordance with various loads, use conditions, and the like. Furthermore, all or arbitrary part of the processing functions performed by apparatuses can be realized by a CPU and a program to be analyzed and executed by the CPU, or can be realized as hardware by wired logic.

An aspect of the information processing apparatus, the congestion control method, and the computer-readable recording medium, which are disclosed in the application, takes effect that can inhibit decrease in throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory that stores a congestion window size before congestion is detected, the congestion window size limiting an amount of data to be transmitted; and
a processor coupled to the memory, wherein the processor executes a process comprising:
reducing a current congestion window size to a predetermined size, upon the congestion being detected;
upon path switching occurring after the congestion is detected and upon receiving a first round-trip time of a path after the path switching from a relay device for relaying transmission data to a destination, first correcting the congestion window size before congestion detection which is stored in the memory, using a first calculating formula to calculate the congestion window size based on a difference in a round-trip time between the first round-trip time of the path after the path switching and a second round-trip time of a path before the path switching;
upon path switching occurring after the congestion is detected and upon the information processing apparatus measuring the first round-trip time of the path after the path switching, second correcting the congestion window size before congestion detection which is stored in the memory, using a second calculating formula to calculate the congestion window size based on the measured first round-trip time; and
changing the reduced congestion window size to the size corrected at the first correcting or the second correcting.

2. The information processing apparatus according to claim 1, wherein the changing includes changing the reduced congestion window size to a larger size among the congestion window size before congestion detection which is stored in the memory, and the congestion window size after being corrected at the first correcting or the second correcting.

3. The information processing apparatus according to claim 1, wherein the process further comprises detecting occurrence of the path switching, upon receipt of a control packet to notify the path switching, the control packet including the first round-trip time or bandwidth information, from the relay device, wherein
the first correcting includes correcting the congestion window size before congestion detection, using the first round-trip time or bandwidth information that is extracted from the control packet received.

4. The information processing apparatus according to claim 1, wherein the process further comprises detecting occurrence of the path switching, upon receipt of a control packet to notify the path switching from the relay device, wherein
the second correcting includes measuring the first round-trip time or bandwidth information of the path after the path switching, upon the control packet is received, and correcting the congestion window size before congestion detection, using the measured first round-trip time or bandwidth information.

5. The information processing apparatus according to claim 1, wherein the process further comprises receiving a control packet to notify the path switching, the control packet including the first round-trip time or bandwidth information, and an estimated time needed for the path switching, from the relay device, wherein
the first correcting includes correcting the congestion window size before congestion detection, using the first round-trip time or bandwidth information that has been extracted from the control packet received at the receiving, and
the changing includes changing the reduced congestion window size to the size corrected at the first correcting after a lapse of the estimated time included in the control packet received at the receiving.

6. The information processing apparatus according to claim 1, wherein the process further comprises receiving a control packet to notify the path switching, the control packet including an estimated time needed for the path switching, from the relay device, wherein
the second correcting includes measuring the first round-trip time or bandwidth information of the path after the path switching, upon the control packet is received, and correcting the congestion window size before congestion detection, using the measured first round-trip time or bandwidth information, and
the changing includes changing the reduced congestion window size to the size corrected at the second correcting after a lapse of the estimated time included in the control packet received at the receiving.

7. The information processing apparatus according to claim 1, wherein the changing includes inhibiting the reduced congestion window size from changing to the size corrected at the first correcting or the second correcting, upon receipt of a notification indicating that queue delay due to congestion is occurring from the relay device.

8. A congestion control method comprising:
upon congestion being detected, reducing a current congestion window size to a predetermined size;
upon path switching occurring after the congestion is detected and upon receiving a first round-trip time of a path after the path switching from a relay device for relaying transmission data to a destination, using a first calculating formula to calculate the current congestion window size based on a difference in a round-trip time between the first round-trip time of the path after the path switching and a second round-trip time of a path before the path switching, correcting a congestion window size before congestion detection which is stored in a storage unit, the current congestion window size limiting an amount of data to be transmitted;
upon path switching occurring after the congestion is detected and upon the information processing apparatus measuring the first round-trip time of the path after the switching, correcting the congestion window size before congestion detection which is stored in the storage unit, using a second calculating formula to calculate the current congestion window size based on the measured first round-trip time; and
changing the reduced congestion window size to the corrected size calculated using the first calculating formula or the second calculating formula.

9. A non-transitory computer-readable recording medium having stored therein a program causing a computer to execute a congestion control process comprising:
upon congestion being detected, reducing a current congestion window size to a predetermined size;
upon path switching occurring after the congestion is detected and upon receiving a first round-trip time of a path after the path switching from a relay device for relaying transmission data to a destination, using a first calculating formula to calculate the current congestion window size based on a difference in a round-trip time between the first round-trip time of the path after the path switching and a second round-trip time of a path before the path switching, correcting a congestion window size before congestion detection which is stored in a storage unit, the current congestion window size limiting an amount of data to be transmitted;
upon path switching occurring after the congestion is detected and upon the information processing apparatus measuring the first round-trip time of the path after the path switching, correcting the congestion window size before congestion detection which is stored in the storage unit, using a second calculating formula to calculate the current congestion window size based on the measured first round-trip time; and
changing the reduced congestion window size to the corrected size calculated using the first calculating formula or the second calculating formula.

* * * * *